United States Patent
Shi et al.

(10) Patent No.: US 11,811,339 B2
(45) Date of Patent: Nov. 7, 2023

(54) PREDICTIVE CONTROL METHOD OF CURRENT INCREMENT FOR PERMANENT MAGNET SYNCHRONOUS MOTOR UNDER HIGH-SPEED OPERATION

(71) Applicants: ZHEJIANG UNIVERSITY ADVANCED ELECTRICAL EQUIPMENT INNOVATION CENTER, Zhejiang (CN); ZHEJIANG UNIVERSITY, Zhejiang (CN)

(72) Inventors: Tingna Shi, Zhejiang (CN); Chen Li, Zhejiang (CN); Yan Yan, Zhejiang (CN); Changliang Xia, Zhejiang (CN)

(73) Assignees: ZHEJIANG UNIVERSITY ADVANCED ELECTRICAL EQUIPMENT INNOVATION CENTER, Zhejiang (CN); ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/794,986

(22) PCT Filed: Aug. 3, 2021

(86) PCT No.: PCT/CN2021/110342
§ 371 (c)(1),
(2) Date: Jul. 25, 2022

(87) PCT Pub. No.: WO2022/257258
PCT Pub. Date: Dec. 15, 2022

(65) Prior Publication Data
US 2023/0208329 A1 Jun. 29, 2023

(30) Foreign Application Priority Data

Jun. 10, 2021 (CN) .......................... 202110648245.5

(51) Int. Cl.
*H02P 21/00* (2016.01)
*H02P 21/18* (2016.01)
(Continued)

(52) U.S. Cl.
CPC ...... *H02P 21/0085* (2013.01); *H02P 21/0017* (2013.01); *H02P 21/18* (2016.02);
(Continued)

(58) Field of Classification Search
CPC .. H02P 21/0085; H02P 21/0017; H02P 21/18; H02P 21/22; H02P 25/022; H02P 27/12; B66B 2201/404; B60W 20/11
See application file for complete search history.

(56) References Cited

U.S. PATENT DOCUMENTS

2011/0169436 A1* 7/2011 Takahashi ............... H02P 21/20
318/400.3

FOREIGN PATENT DOCUMENTS

| CN | 103326598 A | * 9/2013 |
|---|---|---|
| CN | 103516284 | 1/2014 |

(Continued)

OTHER PUBLICATIONS

Yi Yang, Improved Model-Predictive Current Control of Permanent Magnet Synchronous Motor Drives with Designed Cost Function, 2022, IEEE, 2836-2841 (Year: 2022).*

(Continued)

*Primary Examiner* — Bickey Dhakal
(74) *Attorney, Agent, or Firm* — JCIPRNET (57) ABSTRACT

The present disclosure provides a predictive control method of current increment for a permanent magnet synchronous motor includes: substituting a mathematical expression of a stator voltage during one control period into a continuous time domain current model to obtain a discrete current prediction model and a predicted current at the next time (Continued)

point; obtaining a predicted current increment from a current increment prediction model by subtracting a predictive current at a present time point from a predictive current at a next time point; establishing a cost function according to a preset reference current increment and the predicted current increment; obtaining an optimal voltage increment by minimizing the cost function; superposing the optimal voltage increment on a stator voltage of a present control period to obtain an optimal stator voltage of a next control period for controlling control the permanent magnet synchronous motor.

6 Claims, 4 Drawing Sheets

(51) Int. Cl.
  *H02P 21/22* (2016.01)
  *H02P 25/022* (2016.01)
  *H02P 27/12* (2006.01)
(52) U.S. Cl.
  CPC ............ *H02P 21/22* (2016.02); *H02P 25/022* (2013.01); *H02P 27/12* (2013.01)

(56) References Cited

FOREIGN PATENT DOCUMENTS

| CN | 108448991 | | 8/2018 | |
| CN | 110266237 A | * | 9/2019 | ............ H02P 21/30 |
| CN | 110557074 | | 12/2019 | |
| JP | 2010252434 | | 11/2010 | |

OTHER PUBLICATIONS

Shuang Wang, Parameter Robustness Improvement of Predictive Current Control for Permanent-Magnet Synchronous Motors, 2022, IEEE, 1619-1626 (Year: 2022).*

"International Search Report (Form PCT/ISA/210) of PCT/CN2021/110342," dated Dec. 9, 2021, pp. 1-5.

"Written Opinion of the International Searching Authority (Form PCT/ISA/237) of PCT/CN2021/110342," dated Dec. 9, 2021, pp. 1-4.

* cited by examiner

PREDICTIVE CONTROL METHOD OF CURRENT INCREMENT FOR PERMANENT MAGNET SYNCHRONOUS MOTOR UNDER HIGH-SPEED OPERATION

CROSS-REFERENCE TO RELATED APPLICATION

This application claims the priority benefit of China application serial no. 202110648245.5, filed on Jun. 10, 2021. The entirety of the above-mentioned patent application is hereby incorporated by reference herein and made a part of this specification.

TECHNICAL FIELD

The present disclosure relates to a predictive control method for permanent magnet synchronous motor. More particularly, it relates to a predictive control method of current increment to improve the current control performance for the motor working in a high-speed condition.

RELATED ART

Due to the limitations of space and service environment, electric vehicles have higher requirements for motors used for driving the electric vehicles. Due to the advantages of high-power density, high efficiency, wide speed range, etc., the permanent magnet synchronous motor is chosen as power source in most enterprises of electric vehicles, such as the Leaf of Nissan and the RAVE EV of Toyota. Since permanent magnet synchronous motor is a typical nonlinear system, the nonlinear control method can achieve better control performance than linear control method (e.g., PI control), such as fuzzy control, sliding mode control and model predictive control. Model predictive control has received more attention and been widely studied for permanent magnet synchronous motor drive systems because of its advantages of fast response, appropriate for multi-variable systems and easy implementation.

Model predictive control is a kind of model-based control method. The existing model predictive control methods commonly employ the prediction model derived from the one-order forward Euler approximation method which ignores the rotor movement during one control period. In particular, the one-order forward Euler approximation method is only suitable for the rotor operated in low-speed condition. However, the electric vehicle requires good performance of the permanent magnet synchronous motor drives under the high-speed condition. When the permanent magnet synchronous motor is under the high-speed operation, the change of the rotor position angle becomes larger during one control period, which results in a large deviation between the actual values of the d axis/q axis stator voltages and the discrete values of the d axis/q axis stator voltages used in the control algorithm, and deteriorates the control performance of the model predictive control. In the practical application of the permanent magnet synchronous motor driving system, the parameters vary with the stator current and temperature of permanent magnet synchronous motor, which causes prediction errors of the predictive model. Besides, the dead-time effect causes the error between the actual voltage outputted by the inverter and the reference voltages, which deteriorates the control performance of the model predictive control. Therefore, the existing technology lacks a predictive control method that can both improve the prediction accuracy for the motor under the high-speed operation and reduce the system parameter sensitivity.

SUMMARY OF INVENTION

The technical problem to be solved by the disclosure is to provide a predictive control method of current increment suitable for the permanent magnet synchronous motor under the high-speed operation.

The technical scheme of the disclosure is:

1) establishing a mathematical expression of a stator voltage during one control period according to a position change of a rotor of the permanent magnet synchronous motor during the one control period;

2) obtaining a continuous time domain current model of the permanent magnet synchronous motor by solving a continuous time domain equation of the permanent magnet synchronous motor;

3) ignoring a stator resistance voltage drop, and substituting the mathematical expression of the stator voltage during the one control period into the continuous time domain current model of the permanent magnet synchronous motor for solving solutions to obtain a discrete current predictive model suitable for the permanent magnet synchronous motor under the high-speed operation, and then obtaining a prediction current at a next time point by using the discrete current predictive model;

4) obtaining a current increment prediction model suitable for the permanent magnet synchronous motor under the high-speed operation by subtracting a predictive current at a present time point from a predictive current at a next time point, and obtaining a prediction current increment calculated from the current increment prediction model;

5) establishing a cost function by taking a squared error at an end of each control period between a preset reference current increment and a predictive current increment as an evaluation criterion; evaluating an error of a stator current increment at the end of each control period corresponding to a stator voltage increment by using the cost function; obtaining an optimal voltage increment which minimizing the cost function by solving a convex optimization problem for the cost function;

6) superposing the optimal voltage increment on a stator voltage of a present control period to obtain an optimal stator voltage of a next control period, and applying the optimal stator voltage to the permanent magnet synchronous motor.

In step 1, the mathematical expression of the stator voltage during one control period is:

$$\begin{bmatrix} u_d(t) \\ u_q(t) \end{bmatrix} = \begin{bmatrix} \cos[(t-kT_s)\omega_r] & \sin[(t-kT_s)\omega_r] \\ -\sin[(t-kT_s)\omega_r] & \cos[(t-kT_s)\omega_r] \end{bmatrix} \begin{bmatrix} u_{d,k} \\ u_{q,k} \end{bmatrix}$$

where, $u_d(t)$ and $u_q(t)$ are the d-axis stator voltage and the q-axis stator voltage, respectively; $T_s$ is the control period; $u_{d,k}$ is the d-axis component of the stator voltage vector at time point $kT_s$, and $u_{q,k}$ is the q-axis component of the stator voltage, where the subscript d represents d-axis, the subscript q represents q-axis, and the subscript k represents the ordinal number of the control period; $\omega_r$ is the electrical angular velocity; k represents the ordinal number of the control period; t represents the present time point.

In step 3, the discrete current prediction model is:

$$i_s(k+1) = A_0(k)i_s(k) + B_0(k)u_s(k) + D_0(k)$$

$$A_0(k) = \begin{bmatrix} \cos(\omega_{r,k}T_s) & \dfrac{L_{q0}}{L_{d0}}\sin(\omega_{r,k}T_s) \\ -\dfrac{L_{d0}}{L_{q0}}\sin(\omega_{r,k}T_s) & \cos(\omega_{r,k}T_s) \end{bmatrix}$$

$$B_0(k) = \begin{bmatrix} \dfrac{T_s}{L_{d0}}\cos(\omega_{r,k}T_s) & \dfrac{T_s}{L_{d0}}\sin(\omega_{r,k}T_s) \\ -\dfrac{T_s}{L_{q0}}\sin(\omega_{r,k}T_s) & \dfrac{T_s}{L_{q0}}\cos(\omega_{r,k}T_s) \end{bmatrix}$$

$$D_0(k) = \begin{bmatrix} \dfrac{\psi_{f0}[\cos(\omega_{r,k}T_s)-1]}{L_{d0}} & -\dfrac{\psi_{f0}\sin(\omega_{r,k}T_s)}{L_{q0}} \end{bmatrix}^T$$

where, $i_s(k+1)$ represents the predictive current vector at time point $(k+1)T_s$; $i_s(k)$ represents the stator current vector at time point $kT_s$; $u_s(k)$ represents the stator voltage vector at time point $kT_s$; $A_0(k)$ represents the coefficient matrix of $i_s(k)$; $B_0(k)$ represents the coefficient matrix of $u_s(k)$; $D_0(k)$ represents the coefficient matrix of the back electromotive force; $\omega_{r,k}$ is the electrical angular velocity at time point $kT_s$, where r represents the symbol related to the rotor; k represents the ordinal number of the control period; $L_{d0}$, $L_{q0}$, and $\psi_{f0}$ are the nominal values of d-axis stator inductances, q-axis stator inductances, and a permanent magnet flux linkage, respectively.

In step 4, the current increment prediction model is:

$$\Delta i_s(k+1) = A_0(k)\Delta i_s(k) + B_0(k)\Delta u_s(k)$$

$$\Delta i_s(k) = i_s(k) - i_s(k-1)$$

$$\Delta u_s(k) = u_s(k) - u_s(k-1)$$

where $\Delta i_s(k+1)$ represents the predicted current increment calculated from the current increment prediction model; $\Delta i_s(k)$ represents the stator current increment between the stator current at time point $kT_s$ and the stator current at time point $(k-1)T_s$; $\Delta u_s(k)$ represents the stator voltage increment between the stator voltage at time point $kT_s$ and the stator voltage at time point $(k-1)T_s$; $i_s(k-1)$ represents the stator current vector at time point $(k-1)T_s$ $u_s(k-1)$ represents the stator voltage vector at time point $(k-1)T_s$; $A_0(k)$ represents the coefficient matrix of $\Delta i_s(k)$; $B_0(k)$ represents the coefficient matrix of $\Delta u_s(k)$.

In step 5, the cost function is established as:

$$\min_{\Delta u_s} J = [\Delta i_s^{ref} - \Delta i_s(k+2)]^T[\Delta i_s^{ref} - \Delta i_s(k+2)] + \Delta u_s(k+1)^T P \Delta u_s(k+1)$$

$$\text{Satisfy: } \begin{cases} |u_s(k) + \Delta u_s(k+1)| \leq U_{max} \\ |i_s(k+1) + \Delta i_s(k+2)| \leq I_{max} \end{cases}$$

where $\Delta i_s^{ref}$ represents the reference current increment; P is the weight factor matrix; $U_{max}$ and $I_{max}$ are the maximal voltage and maximal current of the permanent magnet synchronous motor driving system; the superscript T represents the matrix transpose operation; "Satisfy" represents the constraint conditions; $\Delta i_s(k+2)$ represents the predicted current increment calculated from the current increment prediction model; $\Delta u_s(k+1)$ represents the stator voltage increment from time point $kT_s$ to time point $(k+1)T_s$; J is the value of the cost function.

In step 6, the optimal voltage increment is added to the stator voltage of the present control period to obtain an optimal stator voltage of the next control period, and the optimal stator voltage is:

$$u_s^{opt}(k+1) = u_s(k) + \Delta u_s^{opt}(k+1)$$

where, $u_s(k)$ represents the stator voltage at time point $kT_s$; $u_s^{opt}(k+1)$ represents the optimal stator voltage at time point $(k+1)T_s$; $\Delta u_s^{opt}(k+1)$ represents the optimal voltage increment from time point $kT_s$ to time point $(k+1)T_s$.

The method of the present disclosure has the following beneficial effects:

1. The method of the present disclosure establishes a current increment prediction model by considering the variation of rotor position angle during one control period. Compared with the conventional current prediction model obtained from the first-order forward Euler approximation, the present disclosure makes the current prediction result more accurate and reduces the current ripple of the predictive control method for the permanent magnet synchronous motor under the high-speed operation.

2. The disclosure takes the stator current increment as the state variable and takes the stator voltage increment as the control variable so that the current tracking performance of the predictive current control method based on the current increment prediction model is little affected by the motor parameter variation and the inverter dead-time effect. In addition, the inductance change has little impact on the current fluctuation during the practical operation of the motor.

DESCRIPTION OF EMBODIMENTS

Embodiments of the predictive control method of the current increment suitable for the permanent magnet synchronous motor under high-speed operation are explained with reference to the drawings.

In the following, the method of the disclosure is further introduced based on the detailed principle and situation:

1. Establish the Model of the Permanent Magnet Synchronous Motor:

The rotating coordinate is established and the d-axis aligns on the rotor flux. The continuous time domain model of the permanent magnet synchronous motor is $$\frac{di_s}{dt} = A_s i_s + B_s u_s + D_s \tag{1}$$

In the equation (1), $$A_s = \begin{bmatrix} -\frac{r_{s0}}{L_{d0}} & \omega_r \frac{L_{q0}}{L_{d0}} \\ -\omega_r \frac{L_{d0}}{L_{q0}} & -\frac{r_{s0}}{L_{q0}} \end{bmatrix}; \quad B_s = \begin{bmatrix} \frac{1}{L_{d0}} & 0 \\ 0 & -\frac{r_{s0}}{L_{q0}} \end{bmatrix}; \quad D_s = \begin{bmatrix} 0 \\ -\frac{\omega_r \psi_{f0}}{L_{q0}} \end{bmatrix};$$

where $r_{s0}$, $L_{d0}$, $L_{q0}$, and $\psi_{f0}$ are the nominal values of stator resistance, d-axis inductance, q-axis inductance, and permanent magnet flux linkage, respectively; $\omega_r$ is the electrical angular velocity; $A_s$ represents the coefficient matrix of the current item; $B_s$ represents the coefficient matrix of the voltage item; $D_s$ represents the coefficient matrix related to the back electromotive force; $i_s(t) = [i_d(t), i_q(t)]^T$, where $i_d(t)$, and $i_q(t)$ are the d-axis stator current and the q-axis stator current, respectively; $u_s(t) = [u_d(t), u_q(t)]^T$, where $u_d(t)$ and $u_q(t)$ are the d-axis stator voltage and the q-axis stator voltage, respectively; t represents the time.

By solving (1), the current model of the permanent magnet synchronous motor in continuous time domain is expressed as $$i_s(t) = e^{(t-kT_s)A_s} i_s(k) + \left[ e^{(t-kT_s)A_s} - I \right] A_s^{-1} D_s + \int_{kT_s}^{t} e^{(t-\tau)A_s} B_s u_s(\tau) d\tau \quad (2)$$

In equation (2), $T_s$ is the control period; I is the identity matrix.

2. Establish the Discrete Current Prediction Model of the Permanent Magnet Synchronous Motor Under High-Speed Operation Condition:

The existing predictive current control methods commonly employ the prediction model derived from the first-order forward Euler approximation method which assumes that the value of $\omega_r T_s$ is small enough so that the variation of rotor position angle during one control period can be ignored. The exponential term $e^{(t-kTs)As}$ is equivalently simplified as $(t-kT_s)A_s+I$. Substituting the above assumptions into equation (2) and discretizing equation (2), the conventional current prediction model obtained by using the first-order forward Euler approximation method is discretized as $$i_s(k+1) = A_{c0}(k) i_s(k) + B_{c0}(k) u_s(k) + D_{c0}(k) \quad (3)$$

$$A_{c0}(k) = \begin{bmatrix} 1 - \frac{T_s R_{s0}}{L_{d0}} & \omega_{r,k} \frac{T_s L_{q0}}{L_{d0}} \\ -\omega_{r,k} \frac{T_s L_{d0}}{L_{q0}} & 1 - \frac{T_s R_{s0}}{L_{q0}} \end{bmatrix}; \quad B_{c0}(k) = \begin{bmatrix} \frac{T_s}{L_{d0}} & 0 \\ 0 & \frac{T_s}{L_{q0}} \end{bmatrix};$$

$$D_c(k) = \begin{bmatrix} 0 & -\frac{T_s \omega_{r,k} \psi_{f0}}{L_{q0}} \end{bmatrix}^T;$$

In equation (3), $i_s(k+1) = [i_{d,k+1}, i_{q,k+1}]^T$ represents the predicted current vector at time point $(k+1)T_s$, and $i_s(k+1) = [i_{d,k+1}, i_{q,k+1}]^T$, where $i_{d,k+1}$ and $i_{q,k+1}$ are the d-axis predictive current and q-axis predicted current at time point $(k+1)T_s$, where the subscript d represents d-axis, the subscript q represents q-axis, and the subscript (k+1) represents the (k+1)th control period; $i_s(k)$ represents the stator current vector at $kT_s$ time point, and $i_s(k) = [i_{d,k}, i_{q,k}]^T$, where $i_{d,k}$ and $i_{q,k}$ are d-axis current and q-axis current at time point $kT_s$, where the subscript k represents the kth control period t; $u_s(k)$ represents the stator voltage vector at time point $kT_s$, and $u_s(k) = [u_{d,k}, u_{q,k}]^T$, where $u_{d,k}$ and $u_{q,k}$ are d-axis stator voltage and q-axis stator voltage at time point $kT_s$; $A_{c0}(k)$ represents the coefficient matrix of the stator current item at time point $kT_s$; $B_{c0}(k)$ represents the coefficient matrix of the stator voltage item at time point $kT_s$; $D_{c0}(k)$ represents the coefficient matrix related to the back electromotive force at time point $kT_s$; $\omega_{r,k}$ is the electrical angular velocity at time point $kT_s$, where r indicates a symbol related to the rotor; k represents the ordinal number of the control period.

However, the assumption of $e^{(t-kT_s)A_s} \approx (t-kT_s)A_s + I$ is invalid when the motor works under the high-speed operation, and the variation of rotor position angle during one control period cannot be ignored. This disclosure considers the variation of rotor position angle during one control period, and the stator voltage $u_s(t) = [u_d(t), u_q(t)]^T$ in equation (2) during one control period can be expressed as $$\begin{bmatrix} u_d(t) \\ u_q(t) \end{bmatrix} = \begin{bmatrix} \cos[(t-kT_s)\omega_r] & \sin[(t-kT_s)\omega_r] \\ -\sin[(t-kT_s)\omega_r] & \cos[(t-kT_s)\omega_r] \end{bmatrix} \begin{bmatrix} u_{d,k} \\ u_{q,k} \end{bmatrix} \quad (4)$$

In equation (4), $u_{d,k}$ and $u_{q,k}$ are d-axis voltage and q-axis voltage at time point $kT_s$, respectively; $kT_s \leq t \leq (k+1)T_s$.

Ignoring the stator resistance voltage drop and substituting equation (4) into equation (2), the discrete current prediction model is obtained $$i_s(k+1) = A_0(k) i_s(k) + B_0(k) u_s(k) + D_0(k) \quad (5)$$

$$A_0(k) = \begin{bmatrix} \cos(\omega_{r,k} T_s) & \frac{L_{q0}}{L_{d0}} \sin(\omega_{r,k} T_s) \\ -\frac{L_{d0}}{L_{q0}} \sin(\omega_{r,k} T_s) & \cos(\omega_{r,k} T_s) \end{bmatrix};$$

$$B_0(k) = \begin{bmatrix} \frac{T_s}{L_{d0}} \cos(\omega_{r,k} T_s) & \frac{T_s}{L_{d0}} \sin(\omega_{r,k} T_s) \\ -\frac{T_s}{L_{q0}} \sin(\omega_{r,k} T_s) & \frac{T_s}{L_{q0}} \cos(\omega_{r,k} T_s) \end{bmatrix}$$

$$D_0(k) = \begin{bmatrix} \frac{\psi_{f0}}{L_{d0}} [\cos(\omega_{r,k} T_s) - 1] \\ -\frac{\psi_{f0}}{L_{q0}} \sin(\omega_{r,k} T_s) \end{bmatrix}.$$

In equation (5), $A_0(k)$ represents the coefficient matrix of the stator current item at time point $kT_s$; $B_0(k)$ represents the coefficient matrix of the stator voltage item at time point $kT_s$; $D_0(k)$ represents the coefficient matrix related to the back electromotive force at time point $kT_s$.

Compared with equation (3), equation (5) considers the influence of rotor movement in each control period on the actual operation trajectories of stator current and voltage, so that it can reflect the change of the stator current in one control period more accurately. However, the dead-time effect and motor parameter mismatch still cause the prediction error.

3. Establish the Current Increment Prediction Model of the Permanent Magnet Synchronous Motor Under the High-Speed Operation.

The inverter output voltage error caused by the dead-time effect is related to the three-phase switching states of the inverter and the directions of three-phase currents. Because the three-phase switching mode of the inverter is fixed, and the directions of the three-phase currents do not change frequently, so the voltage errors between two adjacent control periods caused by the dead-time effect can be seemed to be equal. Therefore, the voltage error caused by the dead-time effect can be eliminated to a certain extent by subtracting the stator voltages from another one stator voltage in two adjacent control period. In the motor drives, $\omega_r$ can be seemed to be constant during two adjacent control periods since the control period is short enough, so $A_0(k)$, $B_0(k)$, and $D_0(k)$ can be seemed to be constant during two adjacent control periods. Subtracting the predicted current at time point $(k-1)T_s$ from the predictive current at time point $kT_s$ based on equation (5), the current increment predictive model appropriate for permanent magnet synchronous motor under the high-speed operation is obtained as:

$$\Delta i_s(k+1) = A_0(k)\Delta i_s(k) + B_0(k)\Delta u_s(k) \qquad (6)$$

In equation (6), $\Delta i_s(k+1) = [\Delta i_{d,k+1}, \Delta_{q,k+1}]^T$ represents the predicted current increment calculated from the current increment prediction model, where $\Delta i_{d,k+1}$ and $\Delta i_{q,k+1}$ are d-axis predictive current increment and q-axis predictive current increment, respectively; $\Delta i_s(k)$ represents the stator current increment between the stator current at time point $kT_s$ and the stator current at time point $(k-1)T_s$, i.e., $\Delta i_s(k) = i_s(k) - i_s(k-1)$, and $\Delta i_s(k) = [\Delta i_{d,k}, \Delta i_{q,k}]^T$, where $\Delta i_{d,k}$ is d-axis stator current increment between the d-axis stator current at time point $kT_s$ and the d-axis stator current at time point $(k-1)T_s$, and $\Delta i_{q,k}$ is q-axis stator current increment between the q-axis stator current at time point $kT_s$ and the q-axis stator current at time point $(k-1)T_s$; $\Delta u_s(k)$ represents the stator voltage increment between the stator voltage at time point $kT_s$ and the stator voltage at time point $(k-1)T_s$, i.e., $\Delta u_s(k) = u_s(k) - u_s(k-1)$, and $\Delta u_s(k) = [\Delta u_{d,k}, \Delta u_{q,k}]^T$ where $\Delta u_{d,k}$ is d-axis stator voltage increment between the d-axis stator voltage at time point $kT_s$ and the d-axis stator voltage at time point $(k-1)T_s$, and $\Delta u_{q,k}$ is q-axis stator voltage increment between the q-axis stator voltage at time point $kT_s$ and the q-axis stator voltage at time point $(k-1)T_s$; $u_s(k-1)$ represents the stator voltage at time point $(k-1)T_s$.

The control variable in equation (6) is the stator voltage increment $\Delta u_s(k)$, which indicates that the current increment prediction model can reduce the output voltage error caused by the inverter dead-time effect. Comparing equation (6) with equation (5), it can be seen that the coefficients $A_0(k)$ and $B_0(k)$ in equation (5) and equation (6) are equal, but the back electromotive force item is eliminated in equation (6), i.e., the current increment prediction model is independent of the permanent magnet flux linkage, and is only affected by the stator inductance.

4. Establish the Cost Function

The cost function is established by taking the squared error between the preset reference current increment and the predictive current increment as the evaluation criterion. The cost function is applied to evaluate the error of the stator current increment at the end of each control period corresponding to the stator voltage increment. Considering the delay compensation problem of the predictive current control, the cost function is established as:

$$\min_{\Delta u_s} J = [\Delta i_s^{ref} - \Delta i_s(k+2)]^T [\Delta i_s^{ref} - \Delta i_s(k+2)] + \Delta u_s(k+1)^T P\Delta u_s(k+1) \quad (7)$$

$$\text{Satisfy: } \begin{cases} |u_s(k) + \Delta u_s(k+1)| \le U_{max} \\ |i_s(k+1) + \Delta i_s(k+2)| \le I_{max} \end{cases}$$

where $\Delta i_s^{ref}$ represents the reference current increment; P is the weight factor matrix which is used to determine the importance of voltage increment; $U_{max}$ and $I_{max}$ are the maximal voltage and the maximal current of the permanent magnet synchronous motor driving system; the superscript T represents the matrix transpose operation; "Satisfy" represents the constraint conditions; $\Delta i_s(k+2)$ represents the predicted current increment calculated from the current increment prediction model; $\Delta u_s(k+1)$ represents the stator voltage increment between the stator voltage at time point $(k+1)T_s$ and the stator voltage at time point $kT_s$; J is the value of the cost function. The voltage increment item in the cost function is used to reduce the dynamic overshoot of the motor, and to prevent the motor and power switching suffering from voltage surge and current surge.

5. Obtain the Optimal Stator Voltage Vector

Substituting equation (6) into equation (7), the cost function is established as:

$$\min_{\Delta u_s} J = \Delta u_s(k)^T (B_0^T B_0 + P) \Delta u_s(k) - 2\Delta u_s(k)^T B_0^T [\Delta i_s^{ref} - A_0(k)\Delta i_s(k)] + \quad (8)$$
$$(\Delta i_s^{ref})^T \Delta i_s^{ref} - 2(\Delta i_s^{ref})^T A_0(k)\Delta i_s(k) + \Delta i_s(k)^T A_0^T A_0(k)\Delta i_s(k)$$

According to the convex optimization theory, the extreme value of the cost function J can be obtained by calculating the partial derivative of formula (8) with respect to $\Delta u_s(k)$ and make it zero:

$$\frac{\partial J}{\partial \Delta u(k)} = 0 \qquad (9)$$

By solving equation (9), the optimal voltage increment minimizing the value of J can be derived as $$\Delta_s^{opt} = [B_0^T B_0 + P]^{-1} B_0^T [\Delta \Delta i_s^{ref} - A_0 \Delta i_s(k+1)] \qquad (10)$$

By superposing the optimal voltage increment on the stator voltage at the present control period, the optimal stator voltage is obtained as:

$$u_s^{opt}(k+1) = u_s(k) + \Delta_s^{opt}(k+1) \qquad (11)$$

In equation (11), $\Delta u_s^{opt}(k+1)$ represents the optimal voltage increment from time point $kT_s$ to time point $(k+1)T_s$.

Figure 1:
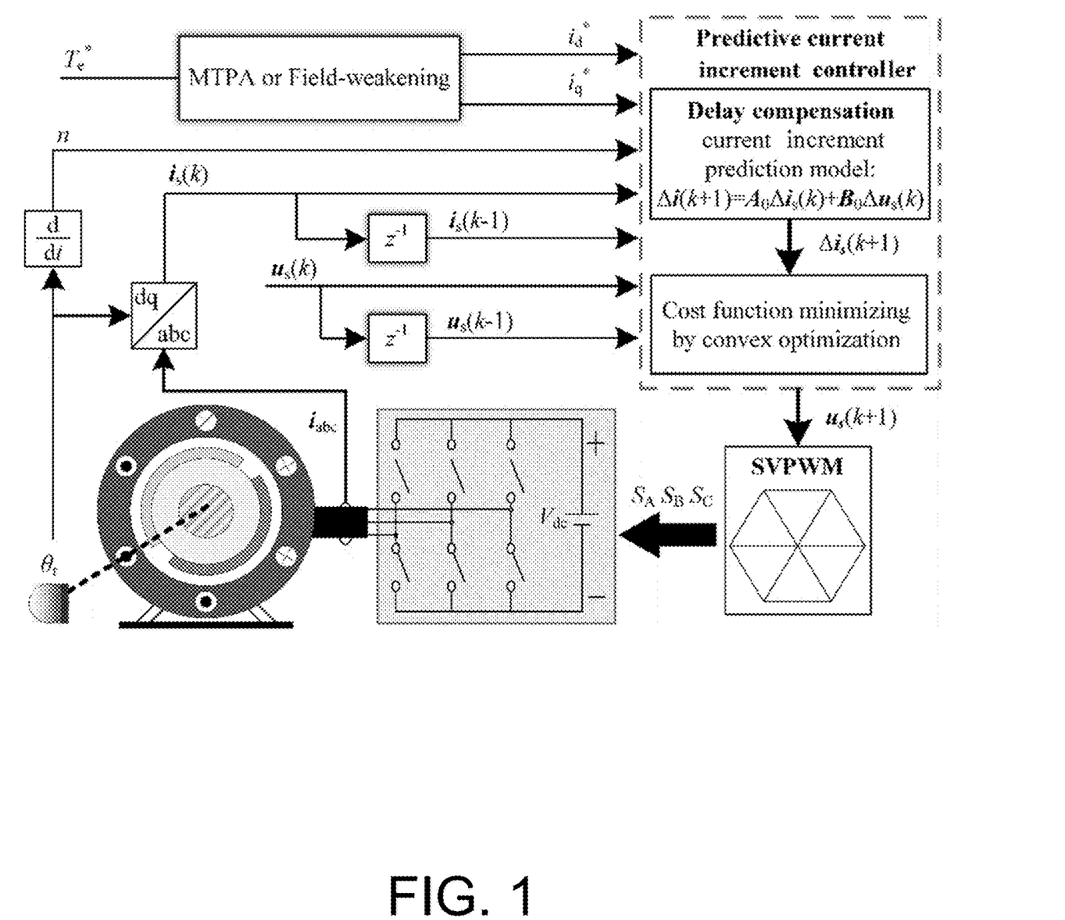
FIG. 1 is the control block diagram which illustrates the predictive control method of current increment suitable for the permanent magnet synchronous motor under the high-speed operation.

The detailed implementation process of the disclosure is shown in FIG. 1 in the form of a control block diagram. Referring to FIG. 1, MTPA represents the maximum torque per ampere, θr represents the angle of the rotor of the motor, SVPWM represents the space vector pulse width modulation. In addition, $S_A$, $S_B$ and $S_C$ represent the switching signals of inverter legs with respect to A, B, and C phases, respectively. This method demonstrated in FIG. 1 improves the current prediction accuracy under high-speed operation and eliminates the use of the permanent magnet flux during implementing the predictive control method of the current increment.

Figure 2:
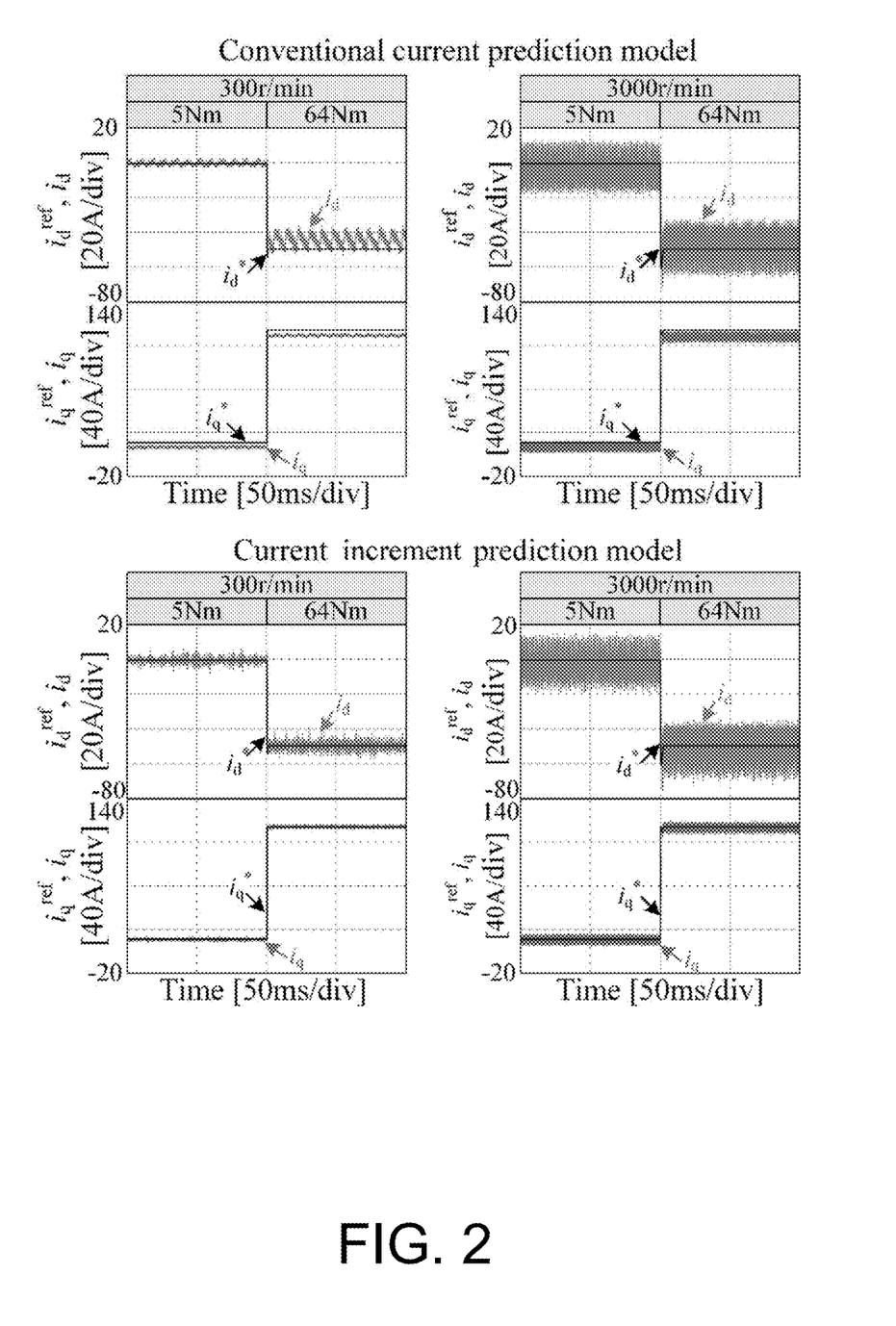
FIG. 2 is the simulation current waveforms of the conventional current predictive model when the deadtime is set to 3 μs and the simulation current waveforms of the current increment prediction model.
Figure 3:
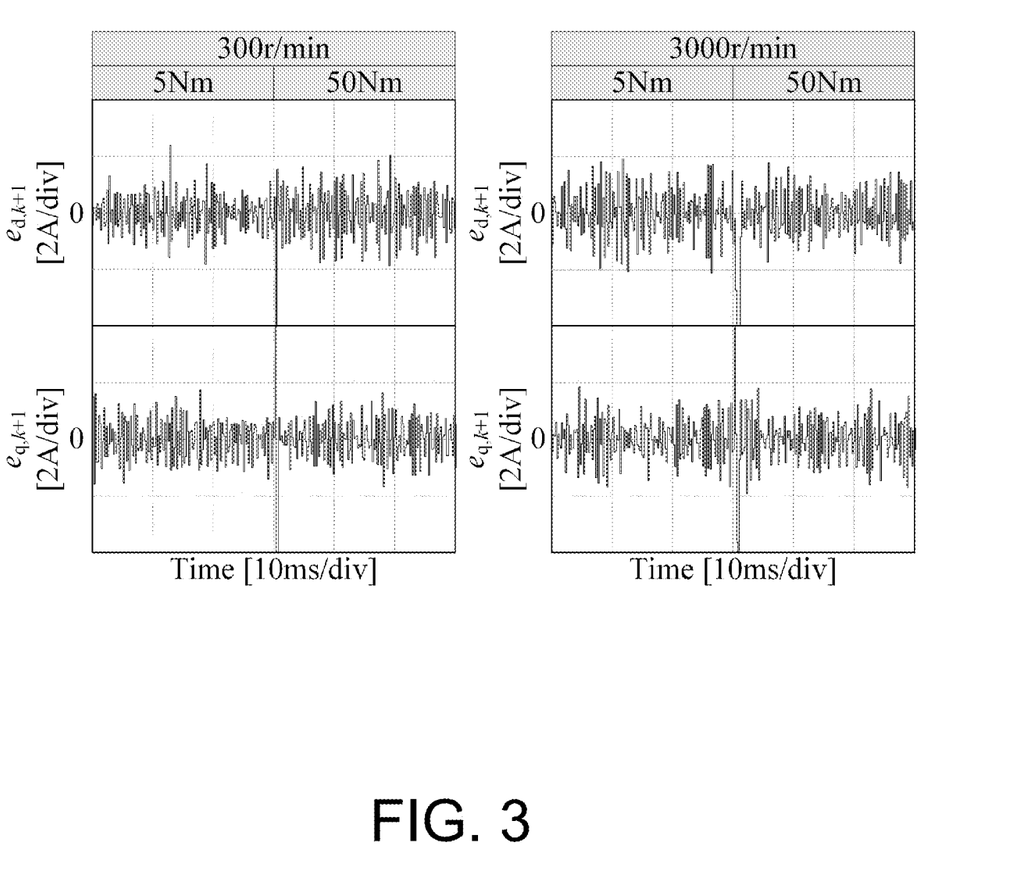
FIG. 3 is the current prediction error waveforms of the current increment prediction model with inductance mismatch under different motor operating conditions.
Figure 4:
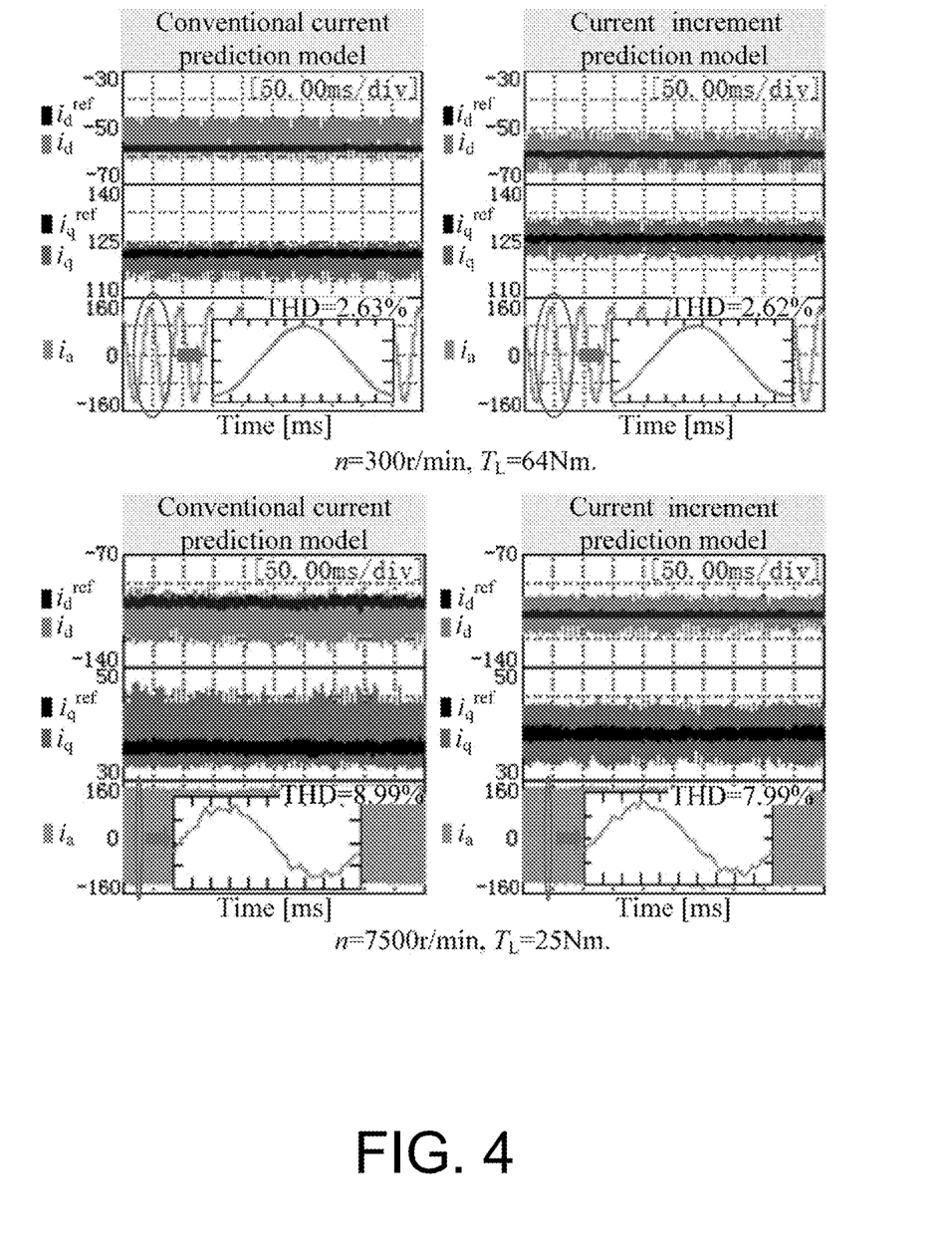
FIG. 4 is the experimental waveforms of d-axis current, q-axis current and a phase current under different motor operating conditions for the predictive current control method based on the conventional current predictive model and for the current increment prediction model.

The feasibility of the proposed method is verified by combining detailed simulation and experimental data shown in FIG. 2, FIG. 3, and FIG. 4.

To verify the practicability and validity of the proposed predictive current control method based on the current increment prediction model, the simulations and experiments are carried out on a 20-kW permanent-magnet synchronous motor system. The parameters of the tested motor are shown in TABLE I. In the experimental platform, the controller taking the DSP (TMS320F28335) as the core is employed for algorithm implementation, and the dynamometer is an induction motor controlled by S120 produced by Siemens.

TABLE I

| parameter | Symbols | Values | Units |
|---|---|---|---|
| Number of pole pairs | $n_p$ | 4 | |
| Rated speed | $n_N$ | 3000 | r/min |
| Rated torque | $T_N$ | 64 | Nm |
| Rotor flux linkage | $\Psi_{f0}$ | 0.07574 | Wb |
| Stator resistance | $r_{s0}$ | 0.00114 | Ω |
| d-axis stator inductance | $L_{d0}$ | 0.2 | mH |
| q-axis stator inductance | $L_{q0}$ | 0.555 | mH |

1. The Influence of the Dead-Time Effect on the Current Control Performance

To eliminate the effect of parameter mismatch, this disclosure checks the effect of the dead-time on the current control performances of the predictive current control method based on the conventional current prediction model and predictive current increment control method in this disclosure by simulation. In the simulation, the conventional current prediction model is shown in (3), the control period $T_s$ is set to 200 μs, and the dead-time $t_d$ is set to 3 μs. FIG. 2 shows the simulation waveforms of preset d-axis reference current $i_d^{ref}$, d-axis current measured value $i_d$, preset q-axis current $i_q^{ref}$ and q-axis current measured value $i_q$ of the predictive current control method based on the conventional current prediction model and predictive control method of the current increment, respectively when the permanent magnet synchronous motor works under different rotating speed n and different load torque $T_L$.

From FIG. 2, it can be seen that there is tracking error of between $i_d^{ref}$ and $i_d$ of the predictive current control method based on the conventional current predictive model when the motor works at 300 r/min with 64 Nm load torque, and the $i_d$ can track $i_d^{ref}$ in other operation conditions. However, the tracking error between $i_q$ and its reference of the predictive current control method based on the conventional current predictive model is significant in different operation conditions. From FIG. 2, it can also be seen that both $i_d$ and $i_q$ of the predictive current increment control method can track their references well.

2. The Analysis of Current Prediction Error Under Parameter Mismatch

In the practical motor drives, there is the errors between the nominal inductances ($L_{d0}$ and $L_{d0}$) and the actual inductances ($L_d$ and $L_d$). Define $\Delta L_d$ and $\Delta L_q$ as the perturbation values of the inductances. Substituting $L_d=L_{d0}+\Delta L_d$ and $L_q=L_{q0}+\Delta L_q$ into equation (6), the predictive current increment of current increment prediction model considering inductance mismatch is obtained as:

$$\Delta i_{sp}(k+1) = \Delta i_s(k+1) + e(k+1) \qquad (12)$$

$$\begin{cases} e(k+1) = \begin{bmatrix} e_{d,k+1} \\ e_{q,k+1} \end{bmatrix} = \Delta A(k) \begin{bmatrix} \Delta i_{d,k} \\ \Delta i_{q,k} \end{bmatrix} + \Delta B(k) \begin{bmatrix} \Delta u_{d,k} \\ \Delta u_{q,k} \end{bmatrix} \\ \Delta A(k) = \begin{bmatrix} 0 & \frac{\Delta L_q L_{d0} - \Delta L_d L_{q0}}{L_{d0}(L_{d0}+\Delta L_d)} \sin(\omega_{r,k} T_s) \\ \frac{\Delta L_q L_{d0} - \Delta L_d L_{q0}}{L_{q0}(L_{q0}+\Delta L_q)} \sin(\omega_{r,k} T_s) & 0 \end{bmatrix} \\ \Delta B(k) = \begin{bmatrix} -\frac{T_s \Delta L_d}{L_{d0}(L_{d0}+\Delta L_d)} \cos(\omega_{r,k} T_s) & -\frac{T_s \Delta L_d}{L_{d0}(L_{d0}+\Delta L_d)} \sin(\omega_{r,k} T_s) \\ \frac{T_s \Delta L_q}{L_{q0}(L_{q0}+\Delta L_q)} \sin(\omega_{r,k} T_s) & -\frac{T_s \Delta L_q}{L_{q0}(L_{q0}+\Delta L_q)} \cos(\omega_{r,k} T_s) \end{bmatrix} \end{cases} \qquad (13)$$

In equation (12), $\Delta i_{sp}(k+1)$ represents the predicted current increment considering inductance mismatch; $e(k+1) =$ $[e_{d,k+1}, e_{q,k+1}]^T$ represents the current prediction error vector caused by inductance mismatch, where $e_{d,k+1}$ and $e_{q,k+1}$ are the d-axis current prediction error and q-axis current prediction error, respectively; $\Delta i_s(k+1)$ has been shown in equation (6).

In equation (13), $\Delta L_d$ represents the error between d-axis actual inductance La and d-axis nominal inductance $L_{d0}$; $\Delta L_q$ represents the error between q-axis actual inductance $L_q$ and q-axis nominal inductance $L_{q0}$; $\Delta A(k)$ represents the coefficient matrix of the stator current increment item; $\Delta B(k)$ represents the coefficient matrix of the stator voltage increment item.

From equation (13), it can be seen that the amplitude and sign of current prediction error ($e_{d,k+1}$ and $e_{q,k+1}$) are affected by the state variables ($\Delta i_{d,k}$ and $\Delta i_{q,k}$), the control variables ($\Delta u_{d,k}$ and $\Delta u_{q,k}$) and the angular velocity $\omega_r$. To intuitively illustrate the influence of inductance mismatch on the current prediction error of the current increment prediction model, waveforms of $e_{d,k+1}$ and $e_{d,k+1}$ are shown in FIG. 3 for the current increment prediction model under different operation conditions (motor rotational speed n and load torque $T_L$) when $L_d$ and $L_q$ increase up 20% and 50%, respectively.

For the current increment prediction model, $e_{d,k+1}$ and $e_{q,k+1}$ always fluctuate around zero as shown in FIG. 3. Such current prediction errors mainly impact the current ripples, but have almost no effect on the current tracking error. In addition, the larger the fluctuation range of $e_{d,k+1}$ (or $e_{q,k+1}$) is, the larger the effect of inductance mismatch on the d-axis current ripple (or q-axis current ripple) is. From FIG. 3, it can also be seen the fluctuation ranges of $e_{d,k+1}$ and $e_{q,k+1}$ change very little under different motor operation conditions. When the load torque is light, the amplitudes of d-axis current and q-axis current are not large enough compared with the fluctuation ranges of $e_{d,k+1}$ and $e_{q,k+1}$, so the effects of inductance mismatches on the d-axis current ripple and q-axis current ripple are great. However, as the torque increases, the amplitudes of d- and q-axis currents become large, and the fluctuation ranges of $e_d$ and $e_q$ become small compared with amplitudes of d- and q-axis currents. So the effects of inductance mismatch on the current ripples reduce. The changes of the inductances under the conditions with different load torque in above analysis are set the same ($\Delta L_d$=20% $L_{d0}$ and $\Delta L_q$=50% $L_{q0}$). However, there are a positive correlation between the inductances and stator currents. In other words, the changes of the inductances in light load are much smaller than the setting values. Therefore, the effect of the inductance mismatch on the current ripples of predictive current increment control is not great in the practical motor operating.

In summary, inductance mismatch has the impact on the current ripple of the predictive control method of the current increment, but the effect of the inductances mismatch is small in the practical motor operating. In addition, the inductance mismatch has almost no effect on the current tracking error.

3. The Comparison of Steady-State Performance

This disclosure compares the steady-state performance of predictive current increment control with the steady-state performance of predictive current control based on conventional current predictive model in a 20 kW PMSM drives. The parameter of the tested PMSM is shown in TABLE I. In the experiment, the motor works at 300 r/min and 7500 r/min, and the output power of the motor is 20 kW.

FIG. 4 shows the steady-state waveforms of the presuppose d-axis reference current $i_d^{ref}$, the d-axis current $i_d$, the presuppose q-axis reference current $i_q^{ref}$ the q-axis current $i_q$ and a-phase current $i_a$ of the predictive current control method based on the conventional current prediction model and current increment prediction model, respectively under different operation condition. From the experimental results, it can be seen that the current ripples of the predictive current increment control do not increase compared with the predictive current control method based on the conventional current predictive model when the motor works at 300 r/min, although current increment prediction model ignores the stator resistance. However, both the d-axis current ripple and q-axis current ripple of predictive current increment control are significantly less than the d-axis current ripple and q-axis current ripple of predictive current control method based on the conventional current prediction model when the motor works at 7500 r/min. In addition, it can be seen that $i_d$ and $i_q$ of predictive current increment control can track their references well, but there are obvious d-axis current tracking error and q-axis current tracking error of predictive current control method based on the conventional current prediction model caused by the dead-time affect and parameter mismatch.

The disclosure does not limit the type of each device except for a special description. so long as the device can complete the above functions.

Technical personnel in this field can understand that the attached figure is only a schematic diagram, and the serial number of the above disclosure implementation cases is only for description, which does not represent the advantages and disadvantages of the implementation cases.

The above is only a better implementation case of the invention, which is not used to limit the invention. Any modification, equivalent replacement, improvement, etc. within the spirit and principle of the invention should be included in the protection scope of the invention.

What is claimed is:

1. A predictive control method of current increment for a permanent magnet synchronous motor under a high-speed operation, wherein the high-speed operation is operated at a speed equal to or higher than 3000 r/min, and the predictive control method of the current increment for the permanent magnet synchronous motor under the high-speed operation comprising the following steps:
   (1) establishing a mathematical expression of a stator voltage during one control period according to a position change of a rotor of the permanent magnet synchronous motor during the one control period;
   (2) obtaining a continuous time domain current model of the permanent magnet synchronous motor by solving a continuous time domain equation of the permanent magnet synchronous motor;
   (3) substituting the mathematical expression of the stator voltage during the one control period into the continuous time domain current model of the permanent magnet synchronous motor for solving solutions to obtain a discrete current prediction model for the permanent magnet synchronous motor under the high-speed operation, and then obtaining a predicted current at a next time point by using the discrete current prediction model;
   (4) subtracting a predictive current at a present time point from a predictive current at a next time point to obtain a current increment prediction model for the permanent magnet synchronous motor under the high-speed region, and then obtaining a predicted current increment calculated from the current increment prediction model;
   (5) establishing a cost function by taking a squared error at an end of each control period between a preset reference current increment and a predicted current increment as an evaluation criterion, and then minimizing the cost function by solving a convex optimization problem for the cost function to obtain an optimal voltage increment;
   (6) superposing the optimal voltage increment on a stator voltage of a present control period to obtain an optimal stator voltage of a next control period, and then apply the optimal stator voltage of the next control period to the permanent magnet synchronous motor.

2. The predictive control method of the current increment for the permanent magnet synchronous motor under the high-speed operation according to claim 1, wherein in step (1), the mathematical expression of the stator voltage during the one control period is:

$$\begin{bmatrix} u_d(t) \\ u_q(t) \end{bmatrix} = \begin{bmatrix} \cos[(t-kT_s)\omega_r] & \sin[(t-kT_s)\omega_r] \\ -\sin[(t-kT_s)\omega_r] & \cos[(t-kT_s)\omega_r] \end{bmatrix} \begin{bmatrix} u_{d,k} \\ u_{q,k} \end{bmatrix}$$

where $u_d(t)$ and $u_q(t)$ are a d-axis stator voltage and a q-axis stator voltage, respectively; $T_s$ is the one control period; $u_{d,k}$ is a d-axis component of a stator voltage vector at time point $kT_s$, and $u_{q,k}$ is a q-axis component of the stator voltage vector at time point $kT_s$, where the subscript d represents d-axis, the subscript q represents q-axis, and the subscript k represents an ordinal number of a control period; $\omega_r$ is an electrical angular velocity of the rotor of the permanent magnet synchronous motor; k represents the ordinal number of the control period; t represents a present time point.

3. The predictive control method of the current increment for the permanent magnet synchronous motor under the high-speed operation according to claim 1, wherein in step (3), the discrete current prediction model is:

$$i_s(k+1) = A_0(k)i_s(k) + B_0(k)u_s(k) + D_0(k)$$

$$A_0(k) = \begin{bmatrix} \cos(\omega_{r,k}T_s) & \frac{L_{q0}}{L_{d0}}\sin(\omega_{r,k}T_s) \\ -\frac{L_{d0}}{L_{q0}}\sin(\omega_{r,k}T_s) & \cos(\omega_{r,k}T_s) \end{bmatrix}$$

$$B_0(k) = \begin{bmatrix} \frac{T_s}{L_{d0}}\cos(\omega_{r,k}T_s) & \frac{T_s}{L_{d0}}\sin(\omega_{r,k}T_s) \\ -\frac{T_s}{L_{q0}}\sin(\omega_{r,k}T_s) & \frac{T_s}{L_{q0}}\cos(\omega_{r,k}T_s) \end{bmatrix}$$

$$D_0(k) = \begin{bmatrix} \frac{\psi_{f0}[\cos(\omega_{r,k}T_s)-1]}{L_{d0}} & -\frac{\psi_{f0}\sin(\omega_{r,k}T_s)}{L_{q0}} \end{bmatrix}^T$$

where $i_s(k+1)$ represents a predicted current vector at time point $(k+1)_Ts$; $i_s(k)$ represents a stator current vector at time point $kT_s$; $u_s(k)$ represents a stator voltage vector at time point $kT_s$; $A_0(k)$ represents a coefficient matrix of $i_s(k)$; $B_0(k)$ represents a coefficient matrix of $u_s(k)$; $D_0(k)$ represents a coefficient matrix of a back electromotive force; $\omega_{r,k}$ is an electrical angular velocity of the rotor of the permanent magnet synchronous motor at time point $kT_s$, where r represents a symbol related to the rotor; k represents an ordinal number of a control period; $L_{d0}$, $L_{q0}$, and $\Psi_{f0}$ are nominal values of a d-axis stator inductance, a q-axis stator inductance, and a permanent magnet flux linkage, respectively.

4. The predictive control method of the current increment for the permanent magnet synchronous motor under the high-speed operation according to claim 1, wherein in step (4), the current increment prediction model is:

$$\Delta i_s(k+1) = A_0(k)\Delta i_s(k)\Delta u_s(k)$$

$$\Delta i_s(k) = i_s(k) - i_s(k-1)$$

$$\Delta u_s(k) = u_s(k) - u_s(k-1)$$

where, $\Delta i_s(k+1)$ represents the predicted current increment calculated from the current increment prediction model; $\Delta i_s(k)$ represents a stator current increment between a stator current at time point $kT_s$ and a stator current at time point $(k-1)T_s$; $\Delta u_s(k)$ represents a stator voltage increment between a stator voltage at time point $kT_s$ and a stator voltage at time point $(k-1)T_s$; $i_s(k-1)$ represents a stator current vector at time point; $(k-1)T_s$; $u_s(k-1)$ represents a stator voltage vector at time point $(k-1)T_s$; $A_0(k)$ represents a coefficient matrix of $\Delta i_s(k)$; $B_0(k)$ represents a coefficient matrix of $\Delta u_s(k)$.

5. The predictive control method of the current increment for the permanent magnet synchronous motor under the high-speed operation according to claim 1, wherein in step (5), the cost function is established as:

$$\min_{\Delta u_s} J = \left[\Delta i_s^{ref} - \Delta i_s(k+2)\right]^T \left[\Delta i_s^{ref} - \Delta i_s(k+2)\right] + \Delta u_s(k+1)^T P \Delta u_s(k+1)$$

$$\text{Satisfy: } \begin{cases} |u_s(k) + \Delta u_s(k+1)| \leq U_{max} \\ |i_s(k+1) + \Delta i_s(k+2)| \leq I_{max} \end{cases}$$

where $\Delta i_s^{ref}$ represents the preset reference current increment; P is a weight factor matrix; $U_{max}$ and $I_{max}$ are a maximal voltage and a maximal current of a permanent magnet synchronous motor driving system; the superscript T represents a matrix transpose operation; "Satisfy" represents constraint conditions; $\Delta i_s(k+2)$ represents the predicted current increment calculated from the current increment prediction model; $\Delta u_s(k+1)$ represents a stator voltage increment between a stator voltage at time point $(k+1)T_s$ and a stator voltage at time point $kT_s$; J is a value of the cost function.

6. The predictive control method of the current increment for the permanent magnet synchronous motor under the high-speed operation according to claim 1, wherein in step (6), the optimal voltage increment is added to the stator voltage of the present control period to obtain the optimal stator voltage of the next control period, and the optimal stator voltage is:

$$u_s^{opt}(k+1) = u_s(k) + \Delta u_s^{opt}(k+1)$$

where $u_s(k)$ represents a stator voltage at time point $kT_s$; $u_s^{opt}(k+1)$ represents an optimal stator voltage at time point $(k+1)T_s$; $\Delta u_s^{opt}(k+1)$ represents an optimal voltage increment from time point $kT_s$ to time point $(k+1)T_s$.

* * * * *